United States Patent
Squires et al.

(10) Patent No.: US 6,417,853 B1
(45) Date of Patent: *Jul. 9, 2002

(54) REGION BASED MOVING IMAGE EDITING SYSTEM AND METHOD

(75) Inventors: Scott Squires, Novato; Forest Key, San Francisco, both of CA (US)

(73) Assignee: Pinnacle Systems, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,460

(22) Filed: Feb. 5, 1998

(51) Int. Cl.$^7$ ............................................. G06T 17/00
(52) U.S. Cl. ....................................... 345/473; 345/474
(58) Field of Search ................................ 345/473, 474, 345/418

(56) References Cited

U.S. PATENT DOCUMENTS

| | | | | | |
|---|---|---|---|---|---|
| 5,544,295 A | * | 8/1996 | Capps | ......................... | 345/473 |
| 5,564,000 A | * | 10/1996 | Halpern | ....................... | 345/473 |
| 5,570,461 A | * | 10/1996 | Yokomizo | .................... | 345/473 |
| 5,572,646 A | * | 11/1996 | Kawai et al. | ................ | 345/473 |
| 5,786,824 A | * | 7/1998 | Sevigny | ....................... | 345/438 |

OTHER PUBLICATIONS

3D Studio Max; 3D Studio Max User's Guide, vol. 2, Rendering and Animation; Copyright Autodesk, Inc., 1996; Chapter 31, pp. 31–1 to 31–33.*

* cited by examiner

*Primary Examiner*—Cliff N. Vo
(74) *Attorney, Agent, or Firm*—Thomas Schneck

(57) ABSTRACT

One embodiment uses a computer system to define areas with moving image information of interest in a sequence of digital moving image frames. The sequence of digital moving image frames has at least three frames, a first frame, a second frame and a third frame, in time sequence. A set of points identifies the areas with moving image information of interest on the first frame. In the third frame, the areas with moving image information of interest are identified with the set of points. Each point in the set of points has an explicitly defined location in the first frame and an explicitly defined location in the third frame. The location of each point in the first frame corresponds to the same areas with moving image information of interest as each point's location in the second and third frames. For example if one of the points is located at the tip of a runner's left toe in the first frame, then that point will be located at the tip of the runner's left toe in both the second and third frames. The computer system automatically computes the location of the areas of interest in the second frame.

40 Claims, 10 Drawing Sheets

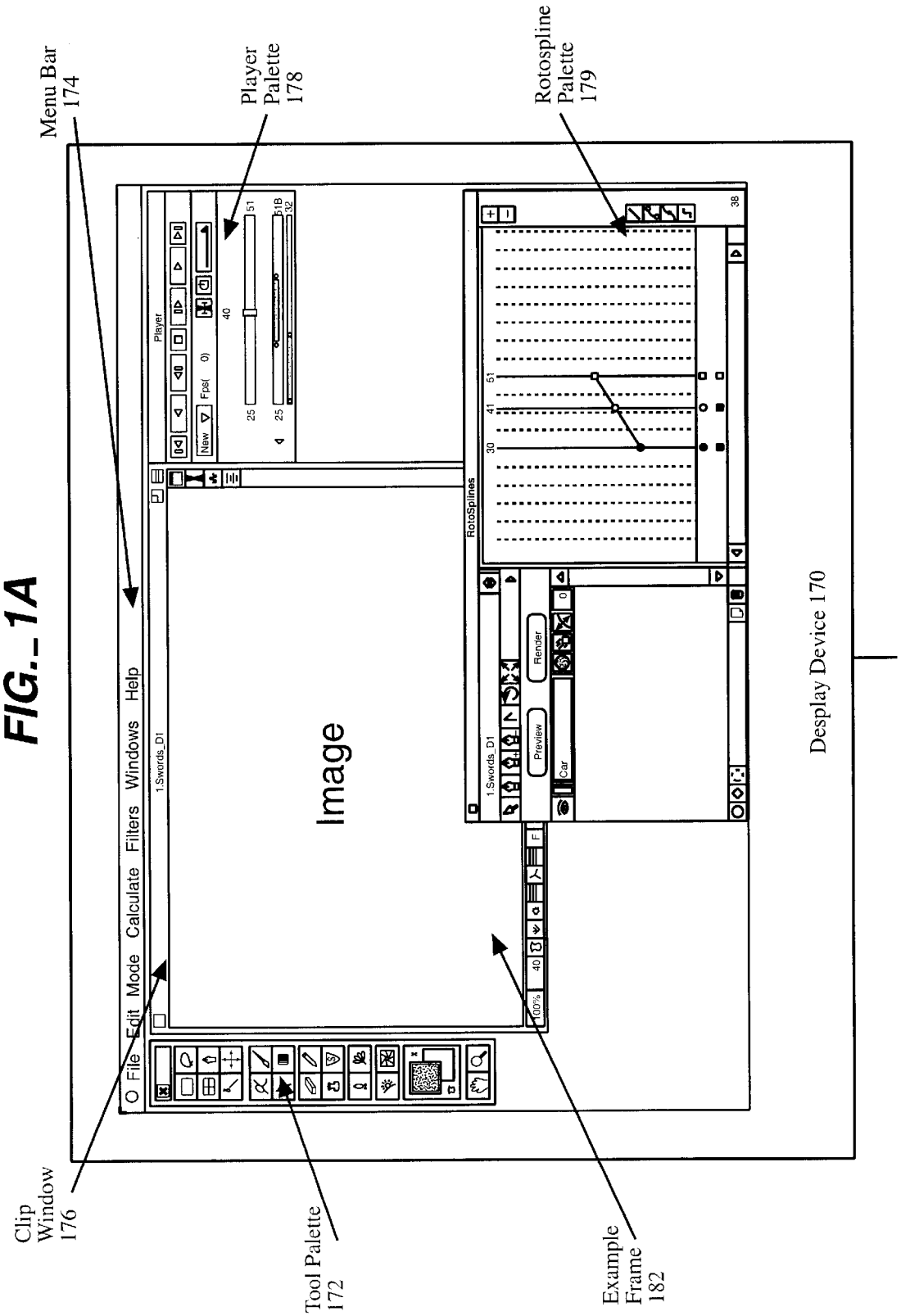
FIG._1A

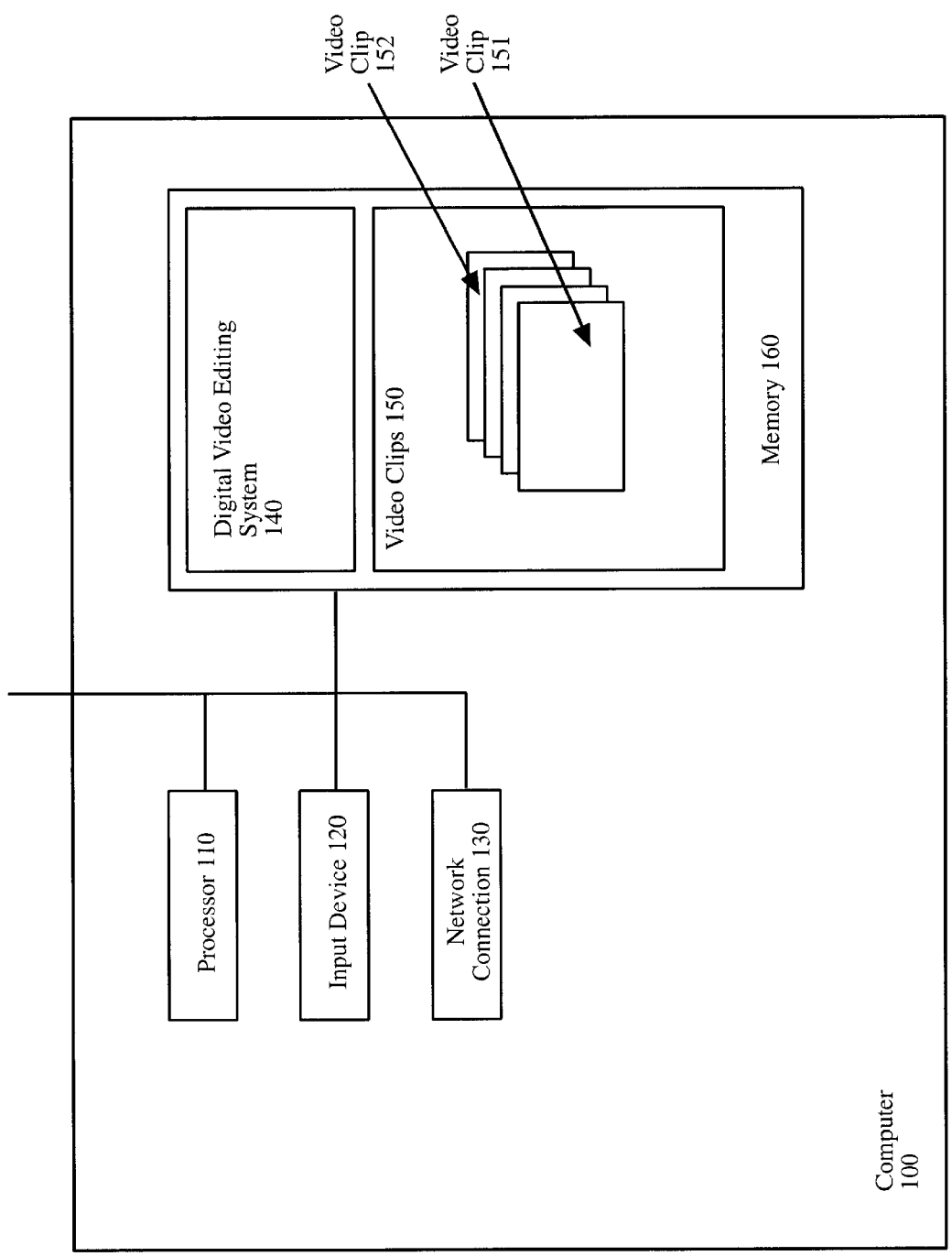
FIG._1B

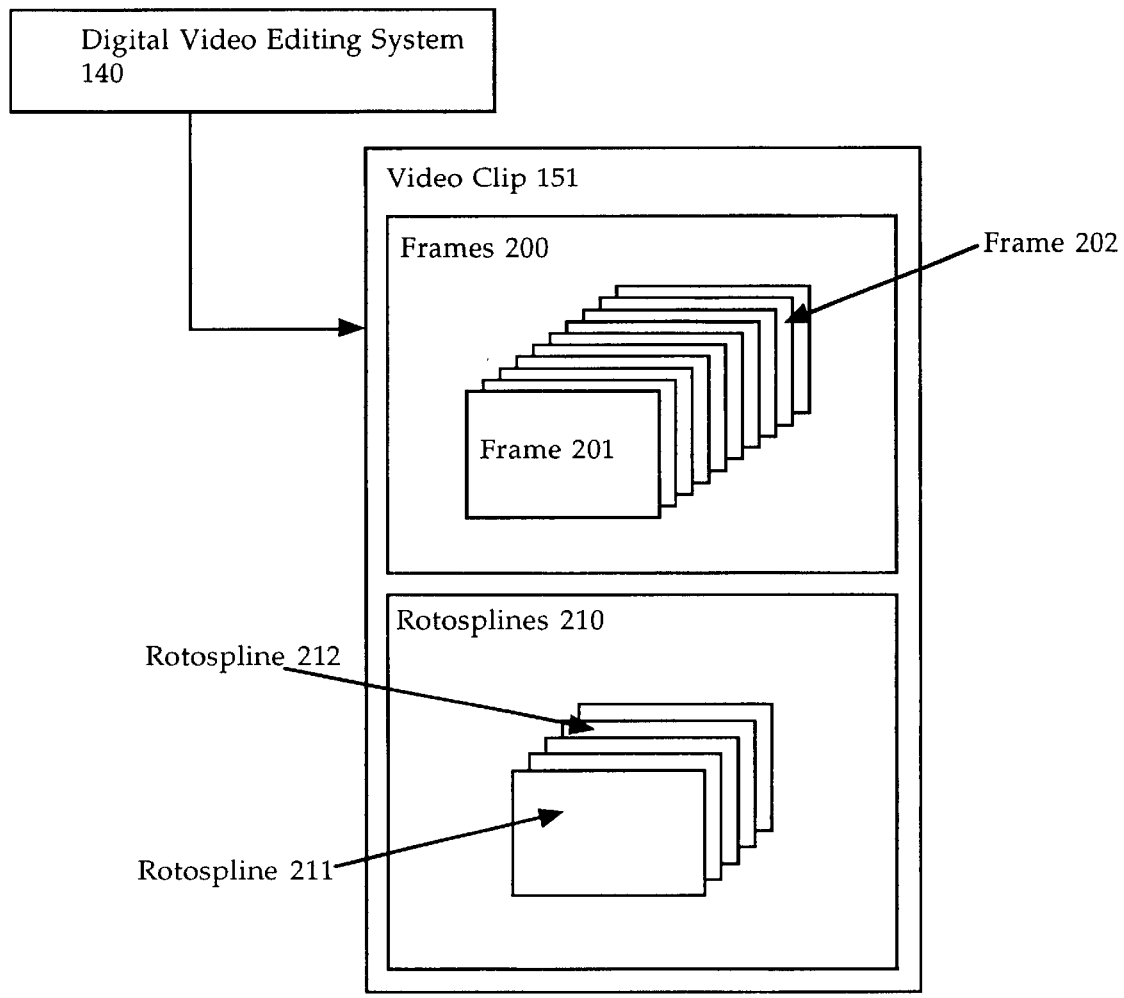
FIG._2A

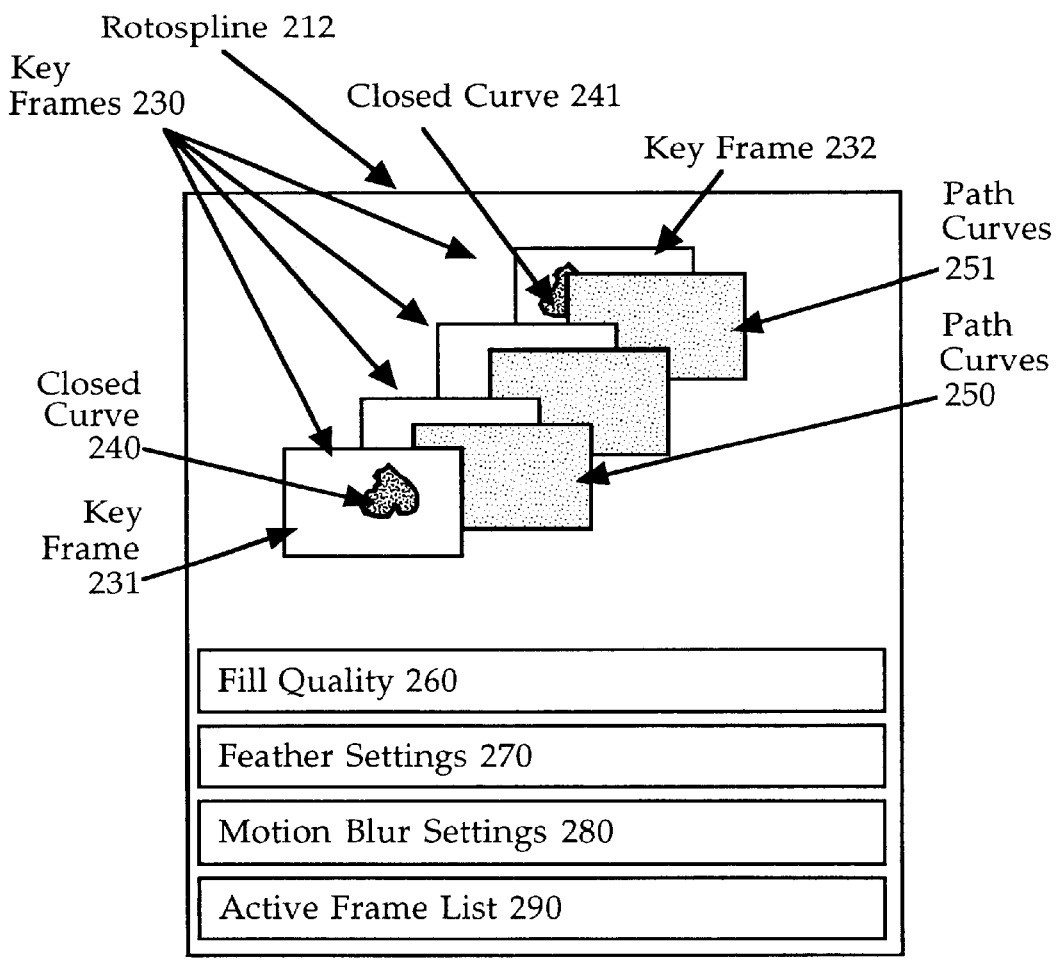
FIG._2B

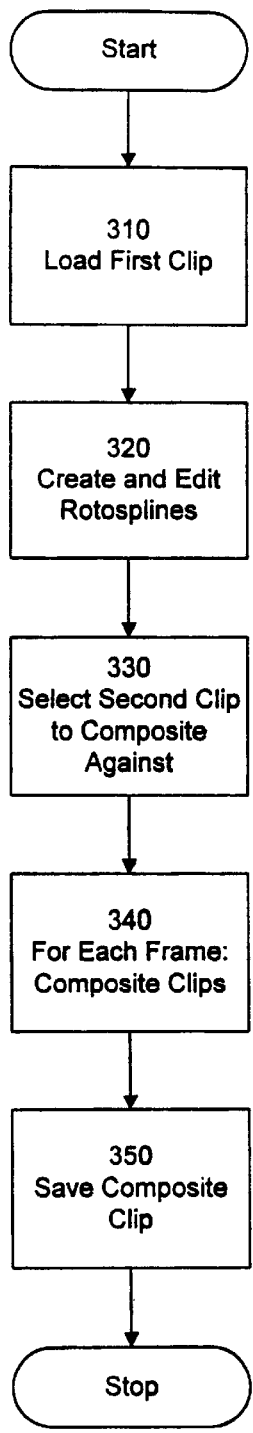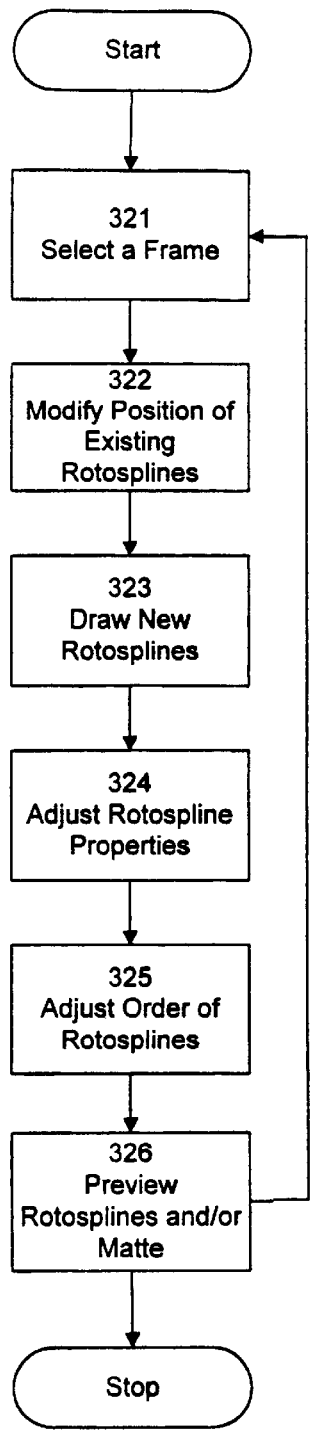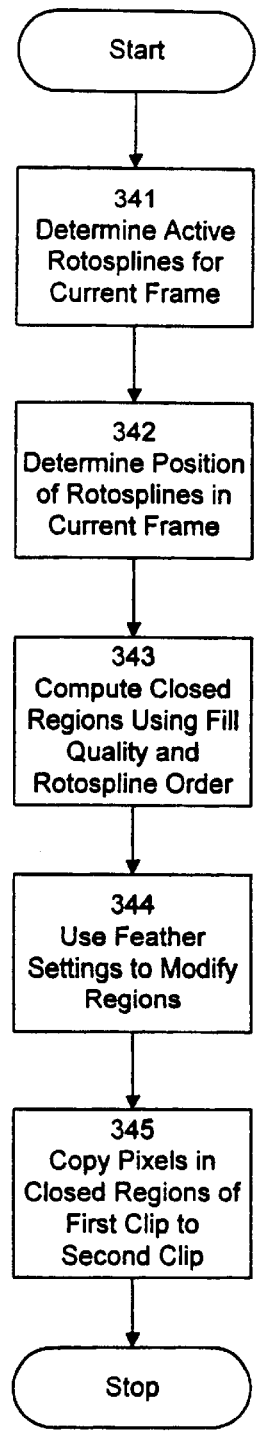
FIG._3A  FIG._3B  FIG._3C

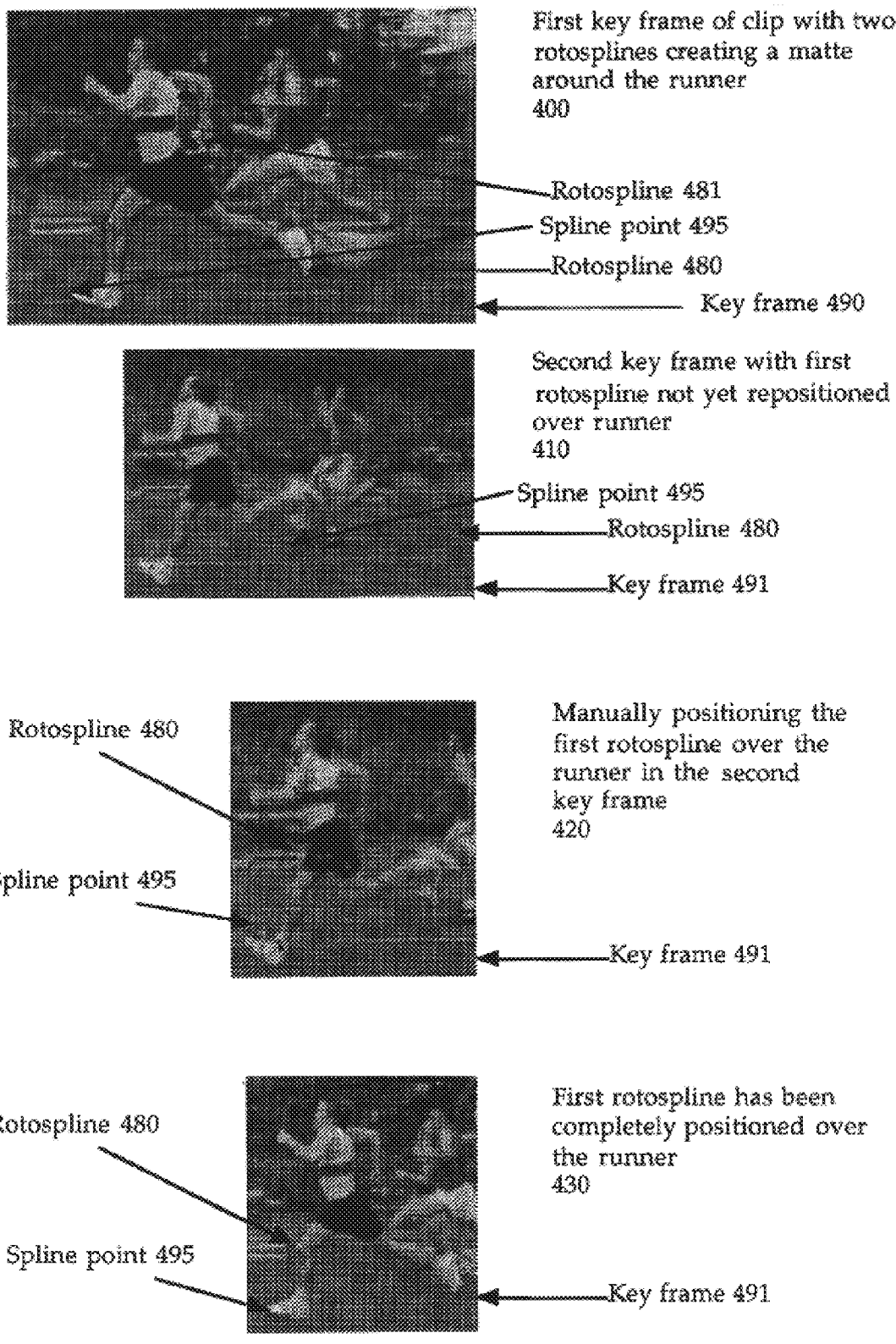
FIG._4

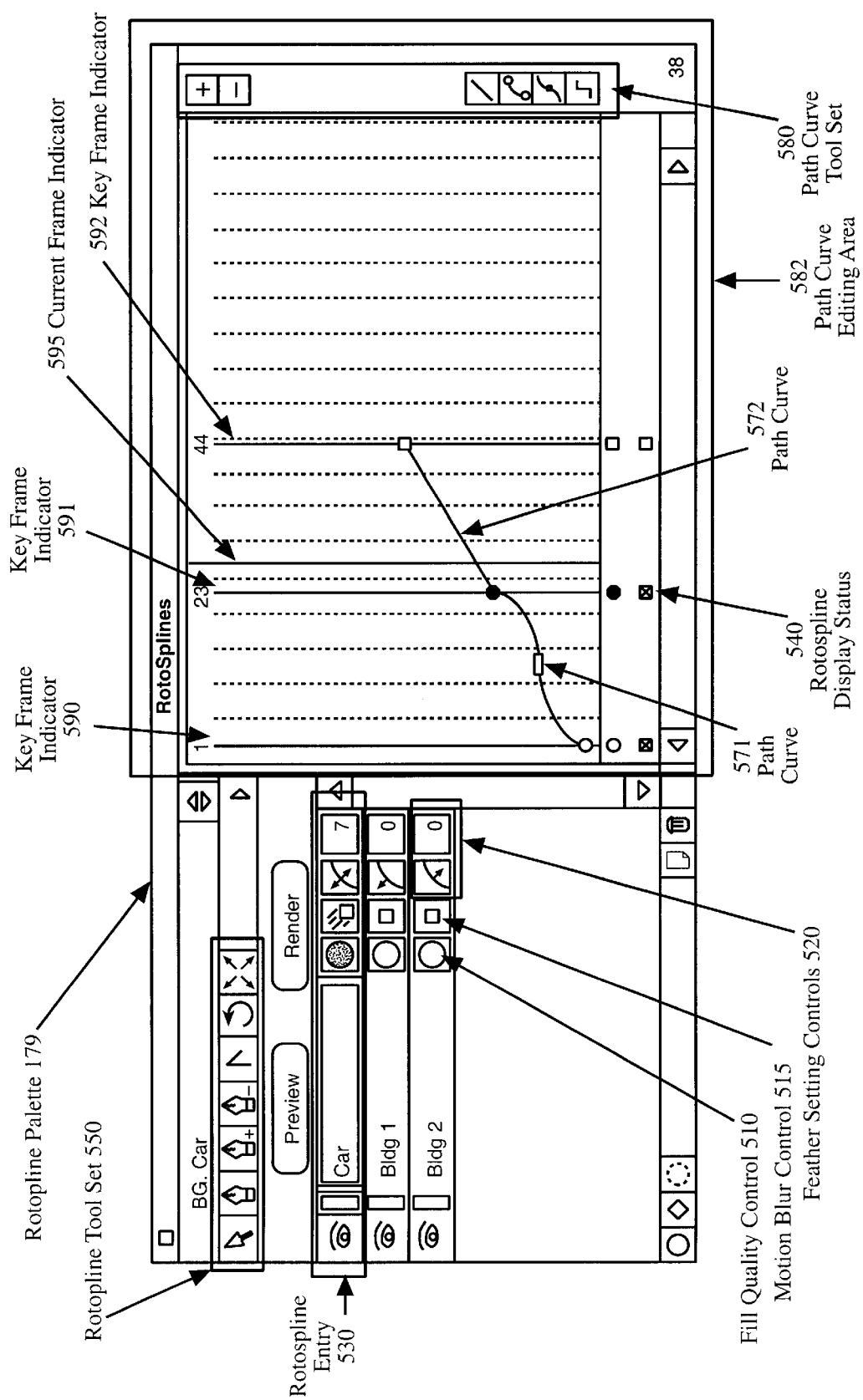
FIG._5

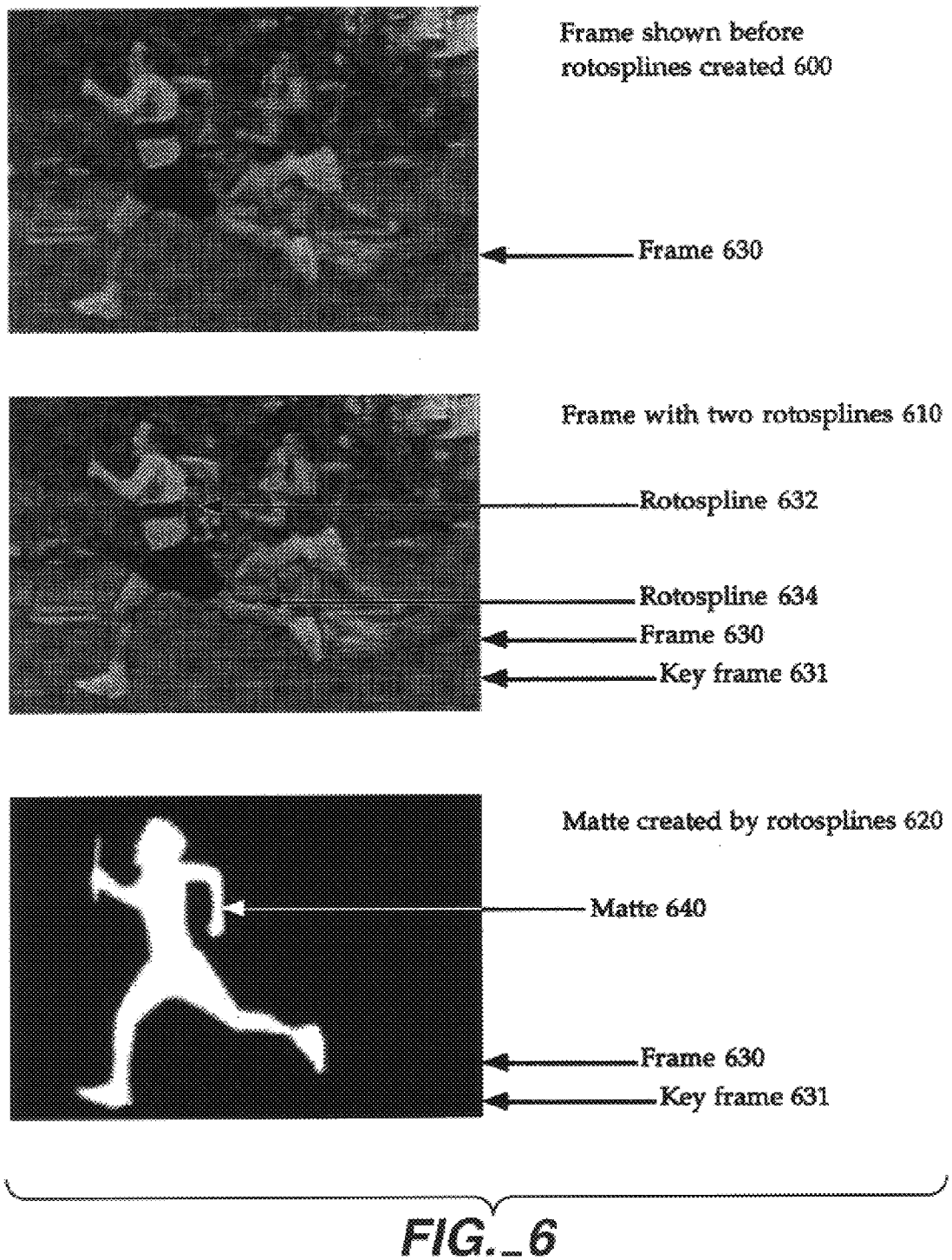
FIG._6

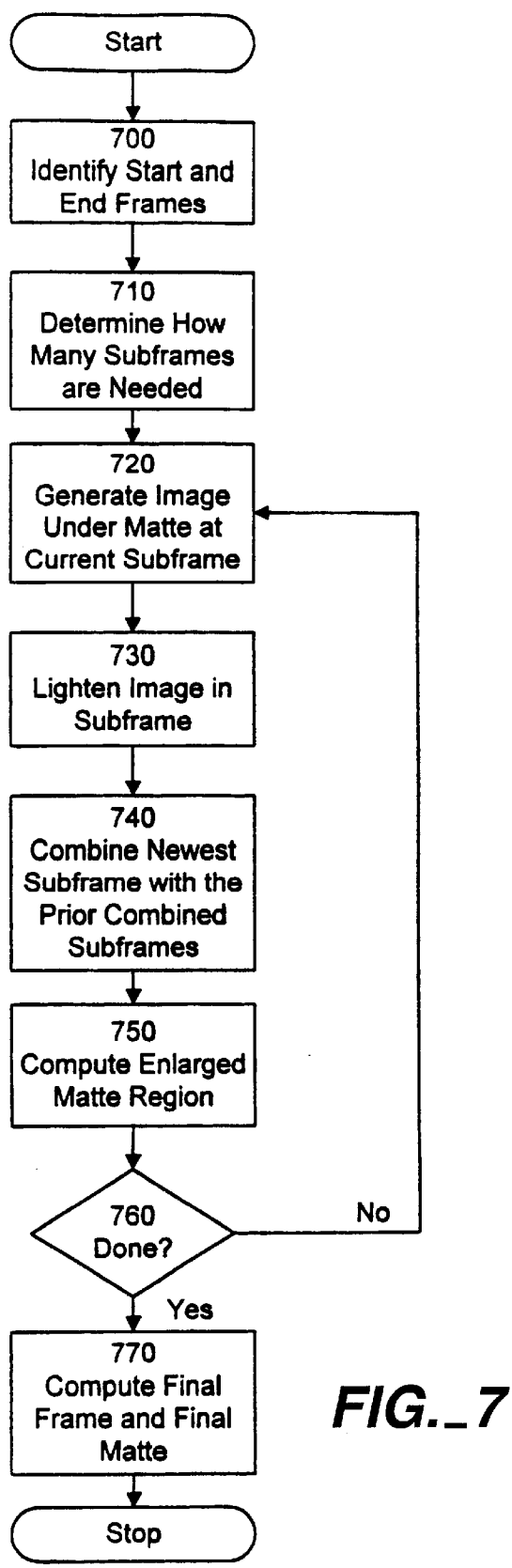
FIG._7

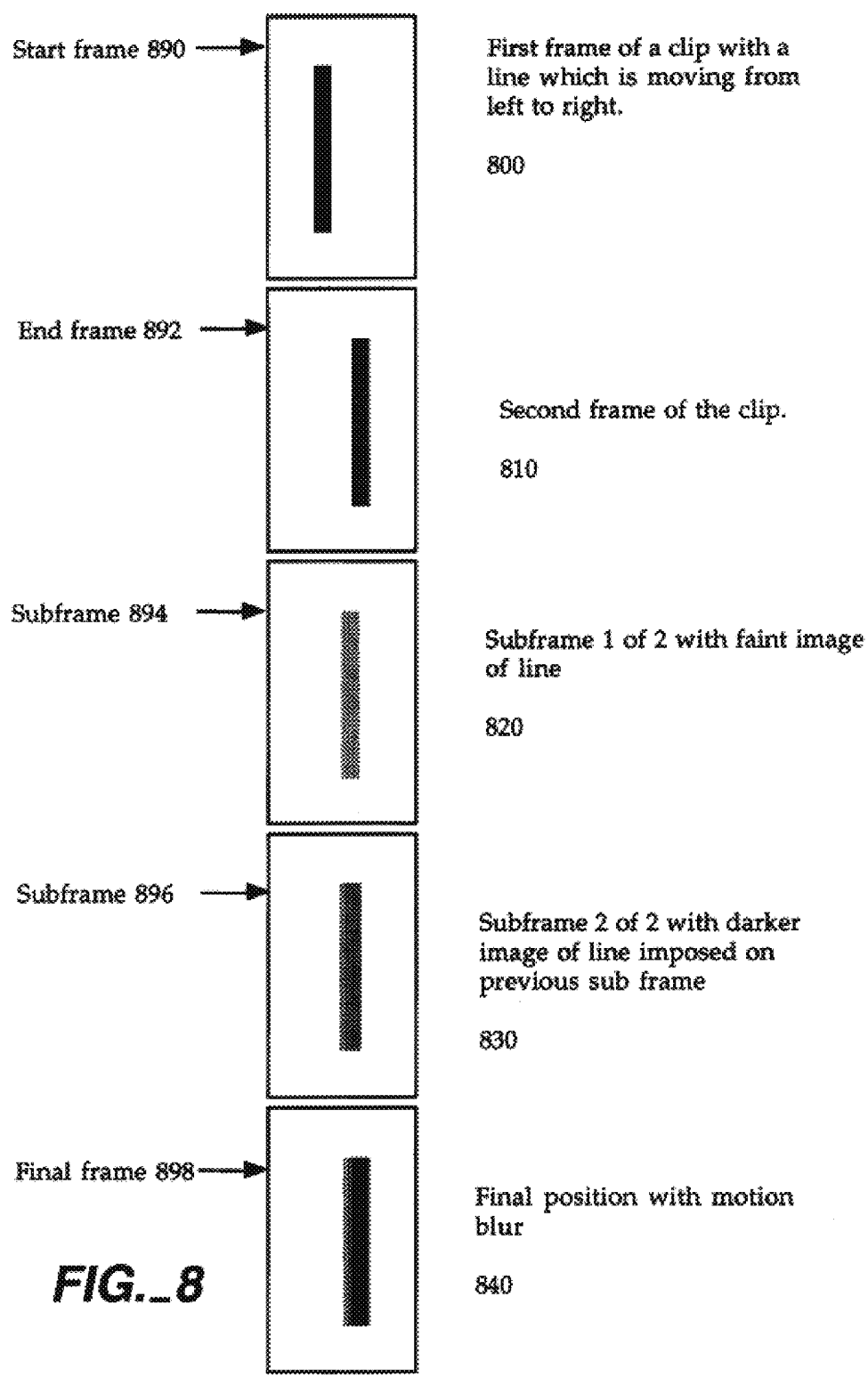

REGION BASED MOVING IMAGE EDITING SYSTEM AND METHOD

RELATED APPLICATIONS

This application relates to, claims priority from, and incorporates by reference, the United States provisional patent application entitled "Moving Image Editing System and Method," having Ser. No. 60/073,179, filed Jan. 30, 1998, having inventors Scott Squires, Forest Key, and being assigned to the assignee of the present invention.

COPYRIGHT NOTICE

A portion of the disclosure of this patent document contains materials that are subject to copyright protection. The copyright owner has no objection to the facsimile reproduction by any one of the patent disclosure, as it appears in the Patent and Trademark Office patents, files or records, but otherwise reserves all copyright rights whatsoever.

BACKGROUND OF THE INVENTION

1. Field of the Invention

This invention relates to the field of digital moving image editing and more particularly the invention relates to a technique for automating the creation of complex mattes to generate rotoscopes.

2. Description of the Related Art

Rotoscoping is a technique for generating special effects shots in movies and other moving image media. One use of rotoscoping is to take footage shot in one context, say of a runner in a stadium, and place it in a different context, such as the banks of the Potomac River. Rotoscoping was used to create complex space and combat scenes in Star Wars. Traditionally rotoscoping required that an animator or other artist hand draw mattes that indicated the areas of interest in each frame of a moving image clip. The mattes would then be used to composite that clip with a second clip. The more complex the object being rotoscoped, the more work that was involved for the animator. Further, one hand drawn matte is necessary for every frame of a sequence of moving images. With 30 frames per second in a movie, the task of hand drawing mattes quickly becomes time consuming and expensive.

Various methods have been used to make rotoscoping less time consuming and less expensive. Some of these methods have employed computer systems. Typically, such systems allow a single matte to be defined on a frame-by-frame basis. More sophisticated systems allow simple interpolation of that matte between frames and reduce the need for the animator to reposition the matte at each frame. These techniques are fairly brittle and typically cannot handle complex scenes without significant human intervention. For example, simple interpolation techniques used on some computer systems cannot capture rotation and scaling effects such as the motion of a sword knocked out of a combatant's hand spinning into the background, thus the animator would need to relocate the matte on each frame. Further, the end product of these systems, as well as the traditional manual techniques, can be aesthetically unpleasant. That is to say the matting effect maybe visible in the final product, especially in areas that have fine details.

The inability of earlier computer systems to easily create multiple mattes with different properties limits the usefulness of the computer system in creating a rotoscope for a scene. For example, if the runner being matted passes behind a tree, a separate matte must be created for the tree. Previously, you could not easily describe multiple mattes in the computer system so that one matte would be considered in front of another matte. Further, the computer systems could not easily handle the disappearance of a matted object if it went out of the frame.

Another limitation of early computer systems is their inability to simulate motion blur. The objects being rotoscoped are typically moving and as a result a strobe like effect may be perceived. To prevent this effect, the composite clip can have a motion blur applied to it. The faint image of the matted object can reduce the strobe effect and reinforce the appearance of motion.

Prior techniques required tedious manual construction of a matte for each frame. Prior automated techniques only allowed the definition of a single matte and did not handle motion blur, feathering, rotation, and scaling of the matte. Accordingly, there is a need for an improved method for automated region based moving image editing.

SUMMARY OF THE INVENTION

A digital moving image editing system that permits the generation of complex mattes for rotoscoping is described.

One embodiment uses a computer system to define areas with moving image information of interest in a sequence of digital moving image frames. The sequence of digital moving image frames has at least three frames, a first frame, a second frame and a third frame, in time sequence. A set of points identifies the areas with moving image information of interest on the first frame. In the third frame, the areas with moving image information of interest are identified with the set of points. Each point in the set of points has an explicitly defined location in the first frame and an explicitly defined location in the third frame. The location of each point in the first frame corresponds to the same areas with moving image information of interest as each point's location in the second and third frames. For example if one of the points is located at the tip of a runner's left toe in the first frame, then that point will be located at the tip of the runner's left toe in both the second and third frames. The computer system automatically computes the location of the areas of interest in the second frame.

In some embodiments, signals are received specifying velocity information for each point of the set of points. The velocity information permits the determination of the areas of interest in the frames in between the first and third frames to be computed with greater precision.

In some embodiments, the edges of the area are blurred either inward or outward to soften the edges of the area.

In some embodiments, multiple sets of points are used to define multiple areas of interest.

In some embodiments, a motion blur effect can be added. This effect improves the visual appearance of the final moving image images.

BRIEF DESCRIPTION OF THE FIGURES

FIG. 1 illustrates a computer system including a digital moving image editing system including one embodiment of the invention.

FIG. 2A illustrates one embodiment of a video clip.

FIG. 2B illustrates one embodiment of a rotospline.

FIG. 3A illustrates one embodiment of a method of creating a third clip by combining two other clips.

FIG. 3B illustrates one embodiment of a method of defining and editing regions on a video clip.

FIG. 3C illustrates one embodiment of a method for automatically computing the location of regions in a first video clip and then modifying the region before combining the region with a second video clip.

FIG. 4 illustrates the creation and editing of a rotospline on a video clip.

FIG. 5 illustrates a set of graphical user interface tools for creating and editing rotosplines in one embodiment of the invention.

FIG. 6 illustrates the matte that is computed from the closed regions.

FIG. 7 illustrates a method of creating a motion blur effect on a region in a video clip.

FIG. 8 illustrates the effect produced by applying motion blur to a region in a video clip.

Although many details have been included in the description and the figures, the invention is defined by the scope of the claims. Only limitations found in those claims apply to the invention.

DETAILED DESCRIPTION
A. Definitions

A video clip is a sequence of moving image information. Examples include a sequence of video frames, a sequence of movie frames, a sequence of computer video buffer frames. The techniques and features described herein are applicable to the editing of any moving digital images. For example, digitized film frames can be used in some embodiments of the invention. Therefore, the term video or video information is used to mean any moving images. Additionally, video clips can be from different sources. For example, a video clip can mean a sequence of moving images from digitized film, video recordings, and/or computer generated images.

Rotoscoping is the process of combining two or more video clips into an output video clip using mattes to describe what is copied to the output video clip.

Mattes describe which regions of a particular frame are copied into the output video clip. In computer based systems, in some embodiments, the mattes are video images that have pixel values of zero in regions outside the matte and some non-zero value in regions inside the matte, or vice versa. Traditionally the mattes were hand painted or drawn onto film.

Areas of interest are closed regions of a frame. The areas of interest can be combined to create a matte for a frame. Some areas of interest will indicate video information that must be excluded from the matte while other areas of interest will indicate video information that is to be included in the matte.

The areas of interest can be described by closed curves. Control points specify the location of the curves and other settings can then determine whether the interior or the exterior of the closed curve is the area of interest.

A path curve, or path curve function, is a continuous function that describes the velocity of a closed curve between two, typically non-sequential, frames. The locations of the control points of the closed curve can be computed for frames in between the first and last frame the path curve is defined for by evaluating the path curve function. By defining multiple path curve functions, the motion of a closed curve can be described across many frames that exhibit a variety of different motions.

Rotosplines are a term used by one implementation to describe the set of control points, closed curves, and other information that describes an area of interest across a video clip and that can be used in constructing a matte for rotoscoping. The term rotospline typically refers to these aggregate components but can also refer to the location of the closed curve on a particular frame depending on the context.

B. System Overview

FIG. 1 depicts a computer system containing an embodiment of the invention.

This paragraph lists the elements in FIG. 1. FIG. 1 includes computer 100. Computer 100 includes a processor 110, an input device 120, a network connection 130, and a memory 160. The memory 160 includes a digital video editing system 140 and a number of video clips 150 including video clip 151 and video clip 152. Display device 170 is used to display tool palette 172, menu bar 174, clip window 176, player palette 178, rotospline palette 179, and example frame 182.

This paragraph describes the interconnections between the elements of FIG. 1. Computer 100 is coupled to display device 170. Processor 110, input device 120, network connection 130, and memory 160 are coupled to a bus within computer 100.

Computer 100 may be a personal computer or a more powerful workstation computer or some other computer. Processor 110 controls computer 100. Processor 110 can be either a single processor or multiple processors coupled to memory 160. Input device 120 allows input to the computer 100. Input device 120 may be a mouse, other pointing device, and/or keyboard that allows a user to control computer 100 and interact with digital video editing system 140. Network connection 130 allows computer 100 to be connected to a network. Digital video editing system 140 and video clips 150 can be stored in memory 160 or distributed across the network for access via network connection 130. In this example, digital video editing system 140 and video clips 150 are included in memory 160. Digital video editing system 140 allows the user to edit video images using computer 100. Display device 170 can be a CRT or other display device.

Processor 110 executes programs on computer 100 and displays results to the user on display device 170. Digital video editing system 140 can be executed on processor 110. Digital video editing system 140 permits the user to perform a number of editing tasks on video clips 150. In some embodiments, the programs used in digital video editing system 140 are included in one or more computer usable media such as CD-ROMs, floppy disks, or other media.

Video clips 150 are presented to the user inside display device 170 through a graphical user interface. Video clip 151 is a sequence of frames including example frame 182. Using input device 120, the user can use tool palette 172, menu bar 174, player palette 178, and rotospline palette 179 that are displayed on display device 170 to edit video clips 150. Example frame 182 has been selected for display by the user from player palette 178. Example frame 182 is shown to the user inside clip window 176 on display device 170.

Tool palette 172 offers a variety of painting tools for manipulating example frame 182. Tool palette 172 has tools that can paint through the video clip such as applying an effect across a range of frames specified by a user selection in player palette 178.

The following describes the use of the elements of FIG. 1. Rotosplines are used by digital video editing system 140 to identify areas in video clip 151 of interest. Using the tools in rotospline palette 179, the user defines control points describing a closed curve that typically surrounds the area of interest. In this example, the control points represent the vertices of the polygon surrounding the area of interest. The user then uses player palette 178 to advance to a different frame in video clip 151. The user then adjusts the position of the vertices of the polygon so that the vertices correspond to the same parts of the area of interest in the new frame. Digital video editing system 140 can then compute the location of the polygon on each of the frames between the two frames where the location of the polygon is explicitly defined. Once the location of the polygon is determined, the area of interest can be identified from the other settings for the rotospline. Next a matte can be constructed using all of the areas of interest identified by the rotosplines.

Rotospline palette 179 offers a number of options for controlling how digital video editing system 140 computes the location of the area of interest on the in between frames. The ability to generate mattes for in between frames significantly reduces the amount of manual labor involved in creating a rotoscope which in turn provides significant time and cost advantages compared to non-computer based techniques. Some of the options available include using a Bezier curve or B-spline curve rather than a polygon to describe the area of interest; feathering the edges of the areas of interest; setting the fill quality of the rotosplines to permit the creation of complex rotoscopes in conjunction with the layering of the rotosplines; simulating motion blur for the areas of interest; providing velocity information which controls how the rotosplines move between frames in which they are explicitly defined and a number of user interface features to assist in editing the rotosplines.

C. Video Clip

FIG. 2A describes the structure of video clip 151.

This paragraph lists the elements of FIG. 2A. Digital video editing system 140 can work with video clip 151. Video clip 151 comprises a sequence of frames 200 and a sequence of rotosplines 210. Frames 200 include a first frame 201 and an n-th frame 202. Rotosplines 210 include a first rotospline 211 and an n-th rotospline 212.

Frames 200 are digital video frames and can be in any of a number of common formats such as a single QuickTime™ movie or a collection of files in formats such as bitmap or PICT. In one embodiment, multiple file formats can be combined.

Rotosplines 210 can be stored separately from, or with, video clip 151. In this example, rotosplines 210 are stored with video clip 151.

Rotosplines 210 are evaluated in order. In this example, rotospline 211 is applied before rotospline 212. The user can adjust the ordering of rotosplines 210. By adjusting the ordering, the user can create complex matte effects that differentiate between rotospline 211 moving behind rotospline 212 as opposed to in front of rotospline 212. This capability significantly reduces the amount of time and effort needed to create rotoscopes because the user can create distinct rotosplines for foreground and background objects along with rotosplines for the moving objects. By taking advantage of the ordering, it is then unnecessary for the user to manually adjust the control points of a rotospline that covers a moving object as it passes behind foreground objects.

D. Rotosplines

FIG. 2B describes the structure of rotospline 212.

This paragraph lists the elements of FIG. 2B. Rotospline 212 includes a sequence of key frames 230 including a first key frame 231 and an n-th key frame 232; a sequence of path curves including a first path curve 250 and an m-th path curve 251; a sequence of sets of points defining the locations of a first closed curve 240 and an n-th closed curve 241; a fill quality 260; feather settings 270; motion blur settings 280; and an active frame list 290.

Key frames are frames in video clip 151 on which the user has explicitly defined the closed curve for a particular rotospline. On each key frame, the control points of the closed curve are explicitly defined. In this example, key frame 231 has closed curve 240 defining the area of interest and key frame 232 has closed curve 241 defining the same area on key frame 232 as the corresponding area on key frame 231. Closed curve 240 comprises a set of control points defining, in this example, a polygon. Some embodiments allow the user to select whether the closed curves are polygons, Bezier curves, Catmull splines, nonuniform, nonrational B-splines, nonuniform, rational B-splines, Overhauser splines, Beta splines, and/or B-spline curves, etc. Path curves describe the motion of the closed curves between key frames. Path curve 250 describes the movement of closed curve 240 between key frame 231 and the next key frame. Similarly path curve 251 describe the movement of the closed curve to the position of closed curve 241 in key frame 232 from the key frame immediately preceding key frame 232.

The fill quality 260 of rotospline 212 is comprised of two independently set values that designate how the closed curve describes the area of interest. The first value describes whether the interior or the exterior of the closed curve is the area of interest. The second value describes whether the area so defined is to be excluded or included in the matte. Fill quality 260 can be used in conjunction with the ordering of rotosplines 210 to create complex mattes. At the most basic level the fill quality allows the user to define additional rotosplines which indicate empty spaces in another rotospline where the background needs to come through. The more complex uses of fill quality stem from the ability to order the evaluation of rotosplines. If one object which is covered by a rotospline passes behind another object, also covered by a rotospline, the order of evaluation together with the fill quality values allow the user to determine the effect. This enables the user to easily have a runner pass behind a tree opposed to in front of it.

The feather settings 270 allow the user to add a blur to the edge of the areas defined by rotospline 212. Using the rotospline palette 179, the user can blur the edge out, in, or both to a user specified degree.

The motion blur settings 280 allows the user to specify a number of different values in order to simulate motion blur. The shutter angle value of motion blur settings 280 controls the amount of blur. The start angle value of motion blur settings 280 controls where the blur begins in the movement of the rotospline from one frame to the next. The quality value of motion blur settings 280 allows the user to select the number of temporal samples to render. The motion blur effect reduces the appearance of strobing for moving objects in the resulting output video clip and thus improves the quality of the resulting rotoscopes.

The active frame list 290 allows the user to turn off rotospline 212 in one or more frames. This is necessary if the object being matted by rotospline 212 disappears from view in video clip 151 for one or more frames.

E. Video Editing

FIG. 3A describes one embodiment of a method for creating a rotoscope.

The first step 310 is to load the first video clip. The entire video clip can be loaded into memory 160. Because video clips tend to be larger than the physical memory of personal computers, one embodiment permits video clips to be edited several frames at a time depending on the size of memory 160. One implementation stores the frames of the clip as a bitmap in memory 160.

The next step 320 is for the user to create and edit rotosplines in the first video clip. The rotosplines identify the areas of interest in the first video clip. Various properties of the rotosplines such as the ordering, key frames, fill quality, path curves, and feathering can all be adjusted by the user. The rotosplines typically only explicitly define the control points of the closed curve in a relatively small number of frames in the entire video clip. By adjusting the number of key frames used, the number of individual rotosplines used, and the path curves between key frames, the quality of the resulting rotoscope can be significantly enhanced.

At step 330, having identified the areas of interest in the first video clip, the user then selects a second video clip to composite with the first. The second clip is loaded into memory 160 in the same fashion as the first video clip. One implementation operates on video clips on a frame by frame basis obviating the need for the entirety of both video clips to be stored in memory 160.

The next step 340 is to composite the matted areas of the first video clip into the second video clip creating the rotoscope on a frame by frame basis. For each frame, the output video clip is created including the video information from the second video clip with the matted video information from the first clip superimposed. Since the closed curves describing the areas of interest are only explicitly defined on a small number of key frames, digital video editing system 140 computes the location of the closed curves of the active rotosplines for each frame to determine the areas of interest. Digital video editing system 140 ensures that all user specified properties of the rotosplines are properly computed for each frame. A matte is then generated to cover the appropriate areas identified by the rotosplines. In one implementation the user can specify scale, translation, and rotation settings to change the position of the matted image in the first clip before it is superimposed onto the second clip.

Finally, at step 350, the resultant output video clip is saved. If the entire output video clip cannot be stored in memory 160 all at once, the composite video clip can be saved on a frame by frame basis.

F. Creating and Defining Rotosplines

FIG. 3B describes one embodiment of a method of creating and editing rotosplines. This can be used in step 320 of FIG. 3A.

First at step 321, the user selects a frame. In one implementation, a player palette 178 allows the user to easily select a frame using a graphical user interface. The player palette 178 uses a slider control to depict the frames of a video clip. By adjusting the slider control with input device 120, the user can quickly jump between parts of the video clip. Player palette 178 allows the user to step through the video clip on a frame by frame basis.

Once a frame has been selected, at step 322, the user can modify the position and properties of existing rotosplines on the frame. If a rotospline identifies an area of interest on the current frame, the digital video editing system 140 computes the location of the closed curve on the current frame. If the user chooses, she can modify the position of the control points of the closed curve on the frame. In one implementation, rotospline palette 179 provides a number of tools for adjusting the shape and position of the points defining the closed curve. If the control points of the closed curve are modified on a frame, that frame then becomes a key frame for that rotospline. The user can modify the path curves that describe the movement of the closed curve between key frames using rotospline palette 179.

At step 323, the user can draw new rotosplines to define additional matted areas or to exclude other areas from the matte. Using input device 120 and the tools in rotospline palette 179, the control points of the closed curve can be positioned in the current frame to properly identify the area of interest that a particular rotospline is tracking. Until the user selects another frame and moves the rotospline to a different location, the area identified by that rotospline is static. One common problem that occurs while defining a matte is that it may become necessary to move the location of a particular control point across a number of frames. In one embodiment it is possible to globally modify the position of a control point across multiple key frames by signaling that the movement is a translation that should be applied to the position of that control point across multiple key frames.

At any point, shown as step 324, the user can adjust the properties of the rotospline in the current frame by adjusting the ordering of the rotospline's fill quality 260, feather settings 270, motion blur settings 280, and the active frame list 290 from the rotospline palette 179. For example by adjusting the fill quality 260, the user can indicate that the closed curve defines an area to be excluded from, or included in, the matte. Additionally, fill quality 260 can indicate whether it is the interior or the exterior of the closed curve that is the area of interest. One embodiment also permits the rotospline to be painted with any of the tools in tool palette 172 by using the "stoke spline" button in rotospline palette 179. For example, a rotospline could be positioned over an anchor and then painted with the wire removal brush to blend out the anchor to the color of the background. The advantage offered by this stroke feature is that it obviates the need to manually paint changes across a video clip separate from the process of developing a rotoscope.

At any point, shown as step 325, the user can adjust the evaluation order of the rotosplines. One embodiment offers a simple back to front evaluation of the rotosplines. The rotospline listed at the top in rotospline palette 179 is treated as the front most rotospline and the last rotospline listed in rotospline palette 179 is treated as the back most rotospline. By adjusting the ordering of the rotosplines, the user can create complex mattes with fewer key frames and less manual adjustment of the control points.

Finally, at step 326, the user can preview either the individual rotosplines or the matte. There are a number of ways in which the user can preview the rotosplines. For example, the user can view the rotosplines as different solid or translucent colors on top of the video clip. Additionally the rotospline can be viewed as an outline on top of the video clip. Player palette 178 enables the user to view a number of frames in real time while digital video editing system 140 computes the location of the rotosplines as necessary.

This process continues with the user selecting frames in step 321 and editing the rotosplines as needed to produce a satisfactory matte.

G. Computing the Location of the Rotosplines for Each Frame

FIG. 3C describes frame to create a method of computing the matte in a frame to create an output video clip. This can be used in step 340 of FIG. 3A.

The first step 341 is to determine the active rotosplines for the current frame. Each rotospline has an active frame list 290 that indicates when a rotospline is inactive; that is to say it is not used for editing in a particular frame.

Next, at step 342, the position of each of the active rotosplines is computed for the current frame 342. If the current frame is a key frame for a particular rotospline, then the position of the closed curve is explicitly defined.

Otherwise, a path curve describes how the closed curve moves from the key frame immediately prior to the current frame to the next key frame. Using the path curve, the locations of the control points are computed and then the resulting closed curve is defined.

Next, at step 343, the fill quality of each rotospline is considered in conjunction with the rotospline's order to define the matte. The fill quality determines the area of interest identified by each rotospline and whether that area is to be included or excluded from the matte. Next, at step 344, the feather settings are then used to modify the areas of interest. By perturbing the regions to a user specified degree, either in, out or both, a blurring effect can create better quality rotoscopes. By then combining all of the areas in a simple front to back order, complex effects can be created.

Finally, in step 345, the pixels in the matted areas are copied into the output video clip.

H. Creating a Rotospline on a Video Clip

FIG. 4 depicts the example process of creating and editing rotosplines in greater detail.

At step 400, a frame of a video clip with two rotosplines creating a matte around the lead runner is shown. In this example, both rotospline 480, which mattes the runner's body, and rotospline 481, which mattes the empty space between the runner's back and his arm, are explicitly defined at this frame. Rotospline 481 is an example of a rotospline that defines negative space; that is to say the fill quality for rotospline 481 indicates that the area included within the polygon should always be excluded from the matte. This frame is a key frame 490 for both rotosplines. Control point 495 of rotospline 480 is positioned over the front tip of the runner's right leg.

Another frame in the video clip is shown at step 410. Rotospline 480 has not yet been repositioned to correspond to the location of the runner in this frame. Control point 495 must be moved by the user to correspond to the new location of the front tip of the runner's right foot in this frame.

At step 420, we see rotospline 480 gradually being repositioned over the runner. Note that control point 495 is now closer to the current position of the tip of the right foot of the lead runner and that all of the control points of rotospline 480 have been moved en masse. Digital video editing system 140 allows both an entire rotospline and individual control points to be repositioned by using input device 120 and the tools in rotospline palette 179.

Next at step 430, we see rotospline 480 completely positioned over the runner. The control points of rotospline 480 are now positioned so that each control point in key frame 490 is in the corresponding location on the runner in key frame 491. Control point 495 is now positioned at the right front tip of the runner's right foot.

I. User Interface Tools

FIG. 5 depicts some of the tools available in rotospline palette 179.

The palette is divided into several areas. The first area comprises the rotospline tool set 550. Rotospline tool set 550 includes controls for adjusting individual control points as well as moving, scaling and rotating an entire rotospline. The second area comprises the rotospline list. Each of the rotosplines in a video clip is listed in front to back order as separate rotospline entries. The front most rotospline is listed at the top and the back most rotospline is listed at the bottom. Each rotospline entry 530 describes much of the information about an individual rotospline. Fill quality control 510 is a part of each rotospline entry in rotospline palette 179. Fill quality control 510 allows the user to specify the fill quality of a rotospline. Each rotospline entry 530 includes feather setting controls 520 that allows the user to specify the feather settings. Each rotospline entry 530 includes motion blur control 515 that allows the user to activate or deactivate motion blur for the rotospline.

Using input device 120, the user can toggle the display of path curve editing area 582 that is part of rotospline palette 179. Path curve editing area 582 of rotospline palette 179 takes up the right hand side of the palette. Path curve editing area 582 displays a two dimensional representation of the clip. The frames of the clip are represented along the x-axis in time sequence. Current frame indicator 595 is drawn inside path curve editing area 582 to indicate the frame currently shown in clip window 176. Key frame indicators show the location of key frames of the rotospline whose path curves are being edited. Key frame indicator 590 shows the first key frame of rotospline entry 530. Key frame indicator 591 shows the second key frame of rotospline entry 530. Key frame indicator 592 shows the third key frame of rotospline entry 530. Each key frame indicator has a control to adjust rotospline display status 540. Rotospline display status 540 adjusts active frame list 290 for rotospline entry 530. If rotospline display status 540 is unchecked for key frame indicator 592 then the rotospline will not be used in generating mattes until at a subsequent key frame the user checks rotospline display status 540 on that key frame's key frame indicator. The tools in path curve tool set 580 allow the user to adjust the path curves. Path curve 571 describes the movement of the closed curve of rotospline entry 530 from the key frame indicated by key frame indicator 590 to the key frame indicated by key frame indicator 591. Path curve 572 describes the movement of the closed curve of rotospline entry 530 from the key frame indicated by key frame indicator 591 to the key frame indicated by key frame indicator 592.

J. Example Matte Effects

FIG. 6 depicts the matte effect created by the rotosplines.

At step 600, the frame is shown before any rotosplines are created. Frame 630 only has the underlying digital video information from the clip and no rotospline information.

At step 610, the same frame is then shown with two rotosplines. Frame 630 is now a key frame for both rotospline 632 and rotospline 634. The closed curve of rotospline 634 for key frame 631 outlines the runner's body. The closed curve of rotospline 632 for key frame 631 outlines the empty space between the runner's back and his arm. Rotospline 632 defines an area of interest that is to be excluded from the matte.

At step 620, the matte created by the two rotosplines is shown. Matte 640 is the solid white area corresponding to the position of the lead runner on frame 630. Because frame 630 is a key frame for both rotosplines in that frame, digital video editing system 140 does not need to compute the location of the rotosplines. During the compositing stage of the rotoscoping process only the pixels of frame 630 that are in the white areas of matte 640 are copied into the output video clip. In all other locations, the output video clip includes the corresponding pixel values from the second video clip.

K. Motion Blur

FIG. 7 describes one embodiment of a method of creating motion blur. Creating motion blur exaggerates an effect that can be seen in photographs taken at a race track. Such photographs frequently have faint streaks from the fast moving cars on the print. It is those faint streaks that motion blur attempts to create to reduce strobing effects and improve the appearance of motion.

The first step 700 is to determine the start and end frame. In this example motion blur will be created between a frame and its immediate successor.

Next, at step 710, the number of subframes that are needed is determined. This could either be based on system provided defaults or user specified input.

The process of creating the actual motion blur then begins as follows. At step 720, the matte and the image under the matte for the current subframe are determined. The path curves comprise a collection of continuous path curve functions. Since the path curve functions are continuous the location of the control point they describe can be computed for any frame or for any time between frames. By computing the position of the closed curve at the subframe using the path curves, the position for the matte is determined. Because the subframes are extremely close in time to the end frame the image and matte for the end frame, are positioned at the center of the location that was computed for the closed curve for the current subframe.

At step 730, the subframe image is then lightened based on the number of subframes being used and other properties. If multiple subframes are being created then the last subframe should have the darkest image.

Next, in step 740, the image of the matted area in the newest subframe is combined with the prior combined subframes. At step 750, the enlarged matte region is computed. The enlarged matte region is the union of the matte region of the current subframe with the matte region of the previous subframe. At step 760, this process continues until each subframe has been created and combined.

Finally, in step 770, the location of the final matte is computed and the combined subframe image is placed onto the end frame. As part of this step the program copies the image under the matte at the end frame back onto the frame so it appears on top of the faint combined subframe image that was placed onto the frame. The complete matte region is also computed by taking the union of the final subframe matte together with the end frame matte.

L. Motion Blur Example

FIG. 8 shows an example of motion blur being generated.

First in step 800, the start frame is the first frame of a clip is shown. The clip has a line moving from the left edge of the frame towards the right edge of the frame in the video clip. The line is matted by a rotospline. Start frame 890 is designated first. Next, in step 810, end frame 892, the next frame of the clip, is designated. In end frame 892, the line matted by a rotospline has moved towards the right. If this clip were shown at 30 frames per second, a strobe like effect would be apparent with the line appearing to pop in and out of the frame.

The user has indicated that 2 subframes are to be created between start frame 890 and end frame 892. In step 820, subframe 894 is generated and the matted image from the end frame is computed faintly at the position the rotospline would be in at the time of subframe 894. Next, in step 830, subframe 896 is generated by computing the location of the rotospline at the time for subframe 896 and then making a faint image, darker than for the previous subframe, at the position of the rotospline in subframe 894 of the matted area from end frame 892. The new subframe is combined with the first subframe.

Finally, in step 840, final frame 898 is created. Final frame 898 comprises the combination of subframe 896 and end frame 892. The matted area includes the union of the rotospline locations in subframe 894, subframe 896 and final frame 898. The motion blur has created final frame 898 that shows streaking away from the direction of motion. These faint streaks help reduce the strobing effect and improve the perception of motion.

M. Conclusion

Thus, a method and apparatus for region based video editing has been described. The method permits the generation of complex mattes for rotoscoping in a fashion that reduces the time and cost involved in rotoscoping. By transforming a personal computer into a powerful tool for rotoscoping this invention has the potential to dramatically increase the frequency with which rotoscoping is used to create special effects shots in television programs and movies.

What is claimed is:

1. A method of defining areas with moving image information of interest in a sequence of digital moving image frames using a computer system, said sequence of digital moving image frames including a first frame, a second frame, and a third frame, in time sequence, said third frame being between said first frame and said second frame, said method comprising:

identifying a first area in said first frame using a first set of points;

identifying a second area in said second frame using said first set of points, said first area and said second area identifying areas with moving image information of interest; and automatically generating a third area for the third frame, said third area corresponding to said areas with moving image information of interest.

2. The method of claim 1 wherein said identifying said first area includes receiving selection signals defining the locations of said first set of points in said first frame.

3. The method of claim 1 wherein said first set of points defines a closed Bezier curve.

4. The method of claim 1 wherein said first set of points defines a polygon.

5. The method of claim 1 wherein each point in said first set of points has a first location in said first frame, a second location in said second frame, and a velocity that describes how the location of said point changes from said first frame to said second frame.

6. The method of claim 1 wherein each point in said first set of points has a first location in said first frame, a second location in said second frame, said first location of each point corresponding to the same locations with moving image information of interest as said second locations of each point in said second frame, said automatically generating said third area includes:

generating a third location for each point in said third frame corresponding to the same locations with moving image information of interest in said third frame.

7. The method of claim 6 wherein each point has a velocity value that describes how the location of said point changes from said first frame to said second frame and said automatically generating said third area includes:

generating the location of each point of said plurality of points in said third frame using said velocity value.

8. The method of claim 1 wherein said automatically generating said third area includes modifying said third area by adding a blur to the edge of said third area.

9. The method of claim 8 wherein adding said blur to the edge of said third area is directed in from the edge of said third area towards the center of said third area.

10. The method of claim 8 wherein adding said blur to the edge of said third area is directed out from the edge of said third area away from the center of said third area.

11. The method of claim 1 wherein said first set of points receives signals defining a set of frames of said sequence of digital moving image frames in which said first set of points is not used for said defining areas with moving image information of interest.

12. The method of claim 1 wherein said first set of points receives signals defining the fill quality of said first set of points, said fill quality indicating one of the interior or exterior of said first polygon corresponds to said first area.

13. The method of claim 1 wherein there exists a fourth frame between said first frame and said second frame, said method comprising:

automatically generating a fourth area for said fourth frame using said first set of points, said fourth area corresponding to said areas with moving image information of interest.

14. The method of claim 1 wherein said defining of areas with moving image information of interest in a sequence of digital moving image frames using a computer system includes:

identifying a fourth area in the first frame using a second set of points;

identifying a fifth area in the second frame using said second set of points, said fourth area and said fifth area identifying areas with moving image information of interest; and automatically generating a sixth area in said third frame using said first set of points and said second set of points, said sixth area corresponding to said areas with moving image information of interest.

15. The method of claim 14 wherein said first set of points is applied before said second set of points, said first set of points having a fill quality that indicates that said first set of points includes area that is to be excluded from said areas with moving image information of interest, said second set of points having a fill quality that indicates that the interior of said second set of points includes area that is to be included with said areas with moving image information of interest, and said first set of points and said second set of points overlap at least in said third frame, and said automatically generating a sixth area includes:

automatically generating a seventh area in said third frame using said first set of points;

automatically generating an eighth area in said third frame using said second set of points;

and removing from said eighth area those portions of said seventh area which overlap said eighth area to generate said sixth area, said sixth area identifying said areas with moving image information of interest.

16. A method of generating a motion blur effect in a sequence of digital moving image frames using a computer system, said sequence of digital moving image frames including a first frame and a second frame, said first frame being before said second frame in said sequence:

identifying a first area in said first frame using a first set of points;

identifying a second area in said second frame using said first set of points, said first area and said second area identifying areas with moving image information of interest;

defining a sequence of subframes between said first frame and said second frame;

determining the location of said first set of points in said sequence of subframes to define a set of subframe areas; and using the locations of said first set of points in said sequence of subframes to generate a faint image of said areas with moving image information of interest on said second frame.

17. The method of claim 16 further including receiving selection signals, said selection signals indicating the number of subframes in said sequence of subframes.

18. The method of claim 16 wherein said generating said faint image of said areas with moving image information of interest on said second frame includes:

associating a intensity value with each subframe;

copying said areas with moving image information of interest in said second area of said second frame to said sequence of subframes centered at said location of said first set of points in each subframe;

using said intensity value to reduce the luminance of said subframes;

copying said areas with moving image information of interest from said sequence of subframes to said second frame; and copying said second area back to said second frame at full luminance.

19. The method of claim 16 wherein generating said faint image of said areas with moving image information of interest on said second frame includes:

making the first subframe of said sequence of subframes the faintest and making the last subframe of said sequence of subframes the least faint.

20. A method of generating a third sequence of digital moving image frames from a first set of digital moving image frames and a second set of digital moving image frames using a computer system, said first set of digital moving image frames including a first area with moving image information of interest, said first set of digital moving image frames including at least a first frame and a second frame, said first area with moving image information of interest being defined by a sequence of sets of points, said sequence of sets of points including at least a first set of points, said first set of points corresponding to a plurality of points, each point having a first location in said first frame, a second location in said second frame, and a velocity that describes how the location of said point changes from said first frame to said second frame, said method comprising:

accessing said first sequence of digital moving image frames;

determining the position of each set of points in said sequence of sets of points in each frame of said first sequence of digital moving image frames;

determining said first area with moving image information of interest in each frame;

extracting said first area with moving image information of interest from each frame of said first sequence of digital moving image frames; and compositing said first area with moving image information of interest from each frame of said first sequence of digital moving image frames with a corresponding frame of said second sequence of digital moving image frames to create said third sequence of digital moving image frames.

21. The method of claim 20 wherein said extracting of said first area with moving image information of interest from each frame of said first sequence of digital moving image frames includes:

generating alpha channel values for the pixels of said first sequence of digital moving image frames, said alpha channel values being less than a value X for pixels outside said first area with moving image information of interest from each from of said first sequence of digital moving image frames and greater than the value X for pixels inside said first area with moving image information of interest from each frame of said first sequence of digital moving image, the value X being a real number.

22. The method of claim 20 wherein said compositing said first area with moving image information of interest from each frame of said first sequence of digital moving image frames with a corresponding frame of said second sequence of digital moving image frames to create said third sequence of digital moving image frames includes:
generating frames of said third sequence of digital moving image frames; and
determining the pixels of frames of said third sequence of digital moving image frames by,
copying the pixels from the corresponding frame of said first sequence of digital moving image frames if said pixel is included in said first area with moving image information of interest, and
copying the pixels from the corresponding frame of said second sequence of digital moving image frames if said pixel is not included in said first area with moving image information of interest.

23. The method of claim 20 wherein said compositing said first area with moving image information of interest from each frame of said first sequence of digital moving image frames with each frame of said second sequence of digital moving image frames to create said third sequence of digital moving image frames includes:
at least one or more of translating, rotating, and scaling said first area with moving image information of interest from each frame of said first sequence of digital moving image frames onto said third sequence of digital moving image frames.

24. The method of claim 20 wherein said compositing said first area with moving image information of interest from each frame of said first sequence of digital moving image frames with each frame of said second sequence of digital moving image frames to create said third sequence of digital moving image frames includes:
accessing values corresponding to levels of intensity;
compositing said first area with moving image information of interest from each frame of said first sequence of digital moving image frames with a corresponding frame of said second sequence of digital moving image frames at said level of intensity.

25. A computer program product comprising:
a computer usable medium having a computer readable program code embodied therein for causing a computer to generate a third sequence of digital moving image frames from a first set of digital moving image frames and a second set of digital moving image frames, said first set of digital moving image frames including a first area with moving image information of interest, said first set of digital moving image frames including at least a first frame, a second frame, and a third frame, said third frame being between said first frame and said second frame in time sequence, said first area with moving image information of interest being defined by a first set of points, each point of said first set of points having a first location in said first frame, a second location in said second frame, and a velocity that describes how the location of said point changes from said first frame to said second frame, said computer usable medium including computer readable program code that accesses said first sequence of digital moving image frames,
computer readable program code that accesses said second sequence of digital moving image frames,
computer readable program code that determines the area indicated by said first set of points in said third frame,
computer readable program code that creates a matte in the shape of said area, and
computer readable program code that uses said matte to composite moving image information from said third frame of said first sequence of digital moving image frames with a corresponding frame of said second sequence of digital moving image frames into a corresponding frame of said third sequence of digital moving image frames.

26. The computer program product of claim 25, wherein code that determines the area indicated by said first set of points in said third frame comprises:
code that accesses a velocity value of each point of said first set of points; and
code that uses said velocity value to compute the location of each point of said first set of points at said third frame.

27. The computer program product of claim 25, wherein said first set of points is ordered, and said code that determines the area indicated by said first set of points in said third frame comprises:
code that determines the location of each point of said first set of points in said third frame;
code that treats the ordered first set of points as a polygon;
code that determines whether each pixel of said third frame is inside or outside said polygon; and
code that creates said area from only pixels inside said polygon.

28. The computer program product of claim 25, wherein code that creates a matte in the shape of said area comprises:
code that creates alpha channel values for said third frames, said alpha channel values being less than a value X for pixels outside said area and greater than the value X for pixels inside said area, said value X being a real number.

29. The computer program product of claim 25, wherein code that uses said matte to composite moving image information from said third frame of said first sequence of digital moving image frames with a corresponding frame of said second sequence of digital moving image frames into said third sequence of digital moving image frames comprises:
code that applies at least one or more of a translation, rotation, and scale to said third frame;
code that copies said corresponding frame of said second digital moving image clip to said corresponding frame of said third digital moving image clip; and
code that copies the pixels from said third frame to said corresponding frame of said third digital moving image clip only if said pixel is included by said matte.

30. A method of defining areas with moving image information of interest in a sequences of digital moving image frames using a computer system, said sequence of digital moving image frames including at least a first frame, a second frame, and a third frame, said third frame being between said first frame and said second frame, in time order, said sequence of digital moving image frames being associated with a first set of points, each point having a first location in said first frame, a second location in said second frame, and a velocity value describing how the corresponding point's location changes from said first frame to said second frame, said method comprising:

receiving selection signals defining said locations of said first set of points on said first frame;

receiving selection signals defining said locations of said first set of points on said second frame;

receiving selection signals defining said velocity values of said first set of points; and automatically computing said areas with moving image information of interest for frames of said sequence of digital moving image frames between said first frame and said second frame, including said third frame, using said velocity value of each point of said first set of points to determine the location of each point of said first set of points on each frame.

31. The method of claim 30 wherein said computer system receives selection signals defining new locations for said first set of points on said first frame and said area with moving image information of interest is automatically recomputed for frames of said sequence of digital moving image frames between said first frame and said second frame.

32. The method of claim 30 wherein said area with moving image information of interest is outlined on said computer system's moving image display.

33. The method of claim 30 wherein said area with moving image information of interest is shown as a single color determined by receiving a selection signal on said computer system's moving image display.

34. The method of claim 30 wherein said area with moving image information of interest is shown alone without displaying the rest of said digital moving image frames.

35. The method of claim 30 wherein selection signals are received defining a feather setting and direction, said setting indicating how much blur should be done to the edge of said first set of points and said direction indicating at least one of away from and towards the center of said first set of points.

36. The method of claim 30 wherein selection signals are received indicating said first set of points does not define an area with moving image information of interest on at least one frame between said first frame and said second frame.

37. The method of claim 30 wherein selection signals are received defining said velocity value for at least one point of said first set of points as a hold curve.

38. The method of claim 30 wherein selection signals are received defining said velocity value for at least one point of said first set of points as a bezier curve.

39. The method of claim 30 wherein selection signals are received defining said velocity value for at least one point of said first set of points as a hermite curve.

40. The method of claim 30 wherein selection signals are received defining at least one or more of a rotation and a scale defining the change in location of said locations of said first set of points between said first frame and said second frame.

* * * * *